United States Patent
Clabburn et al.

(10) Patent No.: US 12,411,500 B2
(45) Date of Patent: Sep. 9, 2025

(54) METHOD AND APPARATUS FOR CONTROLLING A COMMUNICATIVELY ISOLATED WATERCRAFT

(71) Applicant: BAE SYSTEMS plc, London (GB)

(72) Inventors: Lawrence Edward Clabburn, Barrow-in-Furness (GB); Simon Phillip Newby, Barrow-in-Furness (GB); David Charles Alexander Ritchie, Barrow-in-Furness (GB)

(73) Assignee: BAE SYSTEMS PLC, London (GB)

(*) Notice: Subject to any disclaimer, the term of this patent is extended or adjusted under 35 U.S.C. 154(b) by 134 days.

(21) Appl. No.: 18/563,514

(22) PCT Filed: May 18, 2022

(86) PCT No.: PCT/GB2022/051243
§ 371 (c)(1),
(2) Date: Nov. 22, 2023

(87) PCT Pub. No.: WO2022/254177
PCT Pub. Date: Dec. 8, 2022

(65) Prior Publication Data
US 2024/0272644 A1 Aug. 15, 2024

(30) Foreign Application Priority Data

Jun. 2, 2021 (EP) .................................... 21275071
Jun. 2, 2021 (GB) .................................... 2107865

(51) Int. Cl.
*G05D 1/606* (2024.01)
*B63G 8/00* (2006.01)
(Continued)

(52) U.S. Cl.
CPC ............. *G05D 1/606* (2024.01); *B63G 8/001* (2013.01); *B63G 2008/004* (2013.01);
(Continued)

(58) Field of Classification Search
CPC .............. G05D 1/606; G05D 2101/15; G05D 2109/15; G05D 2109/38; G05D 2107/25; B63G 8/001; B63G 2008/004
(Continued)

(56) References Cited

U.S. PATENT DOCUMENTS 10,191,489 B1 * 1/2019 Rapoport ............. G05D 1/0692
11,155,324 B2 * 10/2021 Bjornsson ............... B63B 49/00
(Continued)

FOREIGN PATENT DOCUMENTS

| CN | 108508473 A | 9/2018 |
| CN | 111026145 A | 4/2020 |
| WO | 2022254177 A1 | 12/2022 |

OTHER PUBLICATIONS

International Search Report and Written Opinion received for PCT/GB2022/051243. Mailed: Aug. 26, 2022. 9 pages.
(Continued)

*Primary Examiner* — Yazan A Soofi
(74) *Attorney, Agent, or Firm* — Finch & Maloney PLLC

(57) ABSTRACT

A method of training a machine learning, ML, algorithm to control a watercraft is described. The watercraft is a submarine or a submersible submerged in water. The method is implemented, at least in part, by a computer, comprising a processor and a memory, aboard the watercraft. The method comprises: obtaining training data including respective sets of environmental parameters and corresponding actions of a set of communicatively isolated watercraft, including a first watercraft; and training the ML algorithm comprising determining relationships between the respective sets of environmental parameters and the corresponding actions of the watercraft of the set thereof. A method of controlling a watercraft by a trained ML algorithm is also described.

20 Claims, 3 Drawing Sheets

(51) Int. Cl.
  *G05D 101/15* (2024.01)
  *G05D 107/00* (2024.01)
  *G05D 109/30* (2024.01)

(52) U.S. Cl.
  CPC ..... *G05D 2101/15* (2024.01); *G05D 2107/25* (2024.01); *G05D 2109/38* (2024.01)

(58) Field of Classification Search
  USPC .......................................................... 701/21
  See application file for complete search history.

(56) References Cited

U.S. PATENT DOCUMENTS

| | | | | |
|---|---|---|---|---|
| 11,532,186 | B1* | 12/2022 | Wiegman | G07C 5/0808 |
| 11,842,639 | B2* | 12/2023 | Rice | B60H 1/0073 |
| 2020/0089247 | A1* | 3/2020 | Shkurti | G05D 1/0257 |
| 2024/0020968 | A1* | 1/2024 | Haskin | G06F 16/29 |
| 2024/0027193 | A1* | 1/2024 | Hooper | G08G 3/00 |

OTHER PUBLICATIONS

GB Search Report under Section 17(5) received for GB Application No. 2107865.4, dated Feb. 18, 2022. 3 pages.
Extended European Search Report received for EP Application No. 21275071.5, dated Oct. 8, 2021. 7 pages.

* cited by examiner

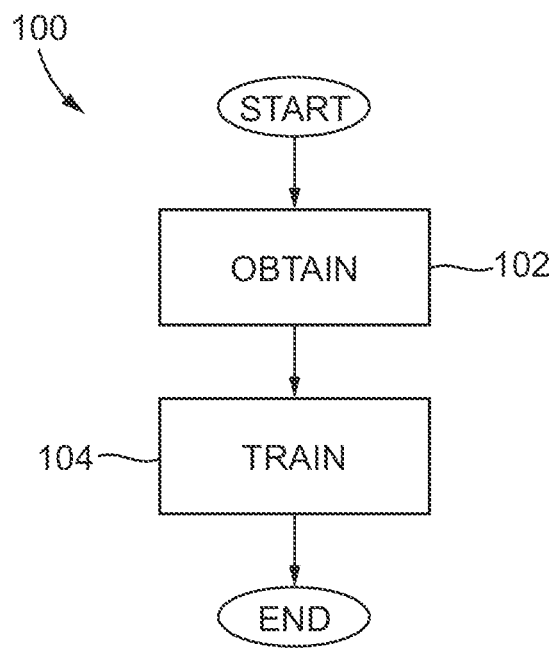
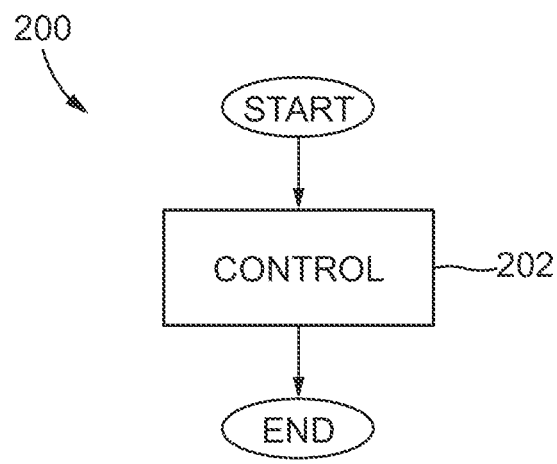

METHOD AND APPARATUS FOR CONTROLLING A COMMUNICATIVELY ISOLATED WATERCRAFT

FIELD

The present invention relates to control of submarines and submersibles.

BACKGROUND

Navigation by submarines and submersibles underwater requires techniques and technologies not required by surface ships, while use of techniques and technologies used by surface ships may be precluded.

Hence, there is a need to improve control of navigation by submarines and submersibles.

SUMMARY

A first aspect provides a method of training a machine learning, ML, algorithm to control a watercraft, wherein the watercraft is a submarine or a submersible submerged in water, the method implemented, at least in part, by a computer, comprising a processor and a memory, aboard the watercraft, the method comprising:
  obtaining training data including respective sets of environmental parameters and corresponding actions of a set of communicatively isolated watercraft, including a first watercraft; and
  training the ML algorithm comprising determining relationships between the respective sets of environmental parameters and the corresponding actions of the watercraft of the set thereof.

In this way, the ML algorithm is trained by determining relationships between the respective sets of environmental parameters and the corresponding actions of the watercraft of the set thereof, thereby providing a trained ML algorithm for controlling a watercraft, for example comprising navigating the watercraft towards a target. Control of submersed submarines and/or submersibles is complex: navigation is dependent on inter alia interpretation of environmental parameters, such as pressure, temperature, salinity, density, tide, current, relative velocity and/or seabed of the water, which in turn affect how the submersed submarines and/or submersibles are to be controlled. Navigation by a particular watercraft, for example to a predetermined target such as a waypoint, may require different control for different voyages due to changes in the environmental parameters, for example locally and/or temporally. Navigation to a new target, for example through water not previously navigated, may be unpredictable. Additionally and/or alternatively, the environmental parameters may be interdependent and/or changes, for example globally and/or locally, thereto complex and/or not possible to model. Hence, the inventors have determined that autonomous control of navigation of submersed submarines and/or submersibles requires onboard machine learning.

Generally, at depths below periscope depth, a submersed submarine and/or submersible determines its position and hence navigates using one or more techniques including: dead reckoning using course information obtained from a gyrocompass, measured speed and estimates of local ocean currents; inertial navigation system to estimate position using acceleration, deceleration, and pitch and roll; and bottom contour navigation where detailed hydrographic data have been charted and there is adequate variation in sea floor topography, enabling fathometer depth measurements to be compared with charted depth patterns. It should be understood that at depths below periscope depth, surface and near-surface navigation techniques, such as satellite navigation, terrestrial radio-based navigation, celestial navigation and RADAR navigation, are precluded while active SONAR navigation may be readily detected and hence not used.

It should be understood that the watercraft is a submarine or a submersible, for example a military submarine or submersible. It should be understood that the respective watercraft of the set thereof, including the first watercraft, are submarines or submersibles, for example military submarines or submersibles. It should be understood that the respective watercraft of the set thereof, including the first watercraft, are submerged in water (i.e. underwater, for example below periscope depth). It should be understood that the respective watercraft of the set thereof, including the first watercraft, are communicatively isolated i.e. incommunicado, unable to or prevented from at least receiving transmissions from external sources. Particularly, data transmission to and/or from submerged watercrafts is problematic, generally of low bandwidth (i.e. low data rates) via the water, if possible, and/or requiring a physically tethered surface transmitter and/or receiver, if possible or desirable. Hence, reliance on external data sources is not possible and thus the respective watercraft of the set thereof are self-reliant. It should be understood that the computer (or respective computers) is aboard (i.e. on board the respective watercraft of the set thereof, including the first watercraft). That is, the ML algorithm is trained in isolation, using training data obtained by, for example only obtained by, the respective watercraft of the set thereof, including the first watercraft. Suitable computers are known.

It should be understood that the steps of obtaining the training data and the training the ML algorithm may be consecutive (i.e. successive or serial, for example, obtaining all the training data followed by training the ML algorithm using the obtained training data) or concurrent (i.e. simultaneous or interleaved, for example, obtaining part of the training data such as a policy and a corresponding trajectory for a particular watercraft of the set thereof followed by training the ML algorithm using the obtained part of the training data and repeating).

It should be understood that the training data may be obtained by recording (i.e. logging, storing in memory) the respective sets of environmental parameters and corresponding actions of the set of communicatively isolated watercraft, for example by including respective recorders thereof aboard the set of watercraft. In this way, the respective sets of environmental parameters and corresponding actions of the set of communicatively isolated watercraft may be obtained from a plurality of voyages through seas and/or oceans, for example according to pre-determined paths. Additionally and/or alternatively, one or more voyages may be repeated, to obtain respective sets of environmental parameters and corresponding actions of the set of communicatively isolated watercraft such that the ML algorithm may be trained for the same voyage under different environmental conditions, for example.

In one example, the training data include respective responses of the set of watercraft to the corresponding actions. That is, respective effects on the set of watercraft caused by the corresponding actions are obtained. For example, if buoyancy of a watercraft is controlled by adjusting a level of a ballast tank thereof to maintain neutral buoyancy at a particular depth upon a change in salinity of the water, a response to the adjustment may be monitored.

In one example, training the ML algorithm comprises determining relationships between the respective sets of environmental parameters, the corresponding actions and the respective responses thereto of the watercraft of the set thereof. That is, the ML algorithm may sense environmental parameters, monitor control actions and measure responses thereto (i.e. a control triangle), thereby providing iterative feedback control.

In one example, the sets of environmental parameters include sensor signals, related to a pressure, a temperature, a salinity, a density, a tide, a current, a relative velocity and/or a seabed of the water. Suitable sensors for sensing these environmental parameters are known.

In one example, determining the relationships between the respective sets of environmental parameters and the corresponding actions of the watercraft of the set thereof comprises detecting boundaries related to the environmental parameters and relating the corresponding actions to the detected boundaries.

In one example, detecting boundaries related to the environmental parameters comprises detecting a thermocline, for example based on a sensed temperature and/or density of the water. Generally, bodies of water, such as oceans, seas and lakes, comprise layers, determined by temperature. The upper or surface layer is the epipelagic zone and interacts with wind and waves, mixing the water and distributing heat. Typically, there is a thermocline at the base of this upper or surface layer. The thermocline is a transition layer between the warmer mixed water in the epipelagic zone and the cooler deep water below. The thermocline is characterised by a sudden change in temperature, decreasing rapidly from the epipelagic zone to the much colder deep water temperature. This sudden change in temperature of the water at the thermocline results correspondingly in a change in density of the water, thereby affecting buoyancy of the watercraft and hence necessitating control actions so as to navigate predictably and/or safely therethrough, reactive and/or proactive to the change in density of the water. For example, a decrease in the density of the water causes the watercraft to dive (i.e. move to a greater depth) while an increase in the density of the water causes the watercraft to surface (i.e. move to a lesser depth), until neutral buoyancy is achieved. Hence, to maintain a constant depth, buoyancy and/or a trajectory of the watercraft must be controlled so as to account for changes in density of the water, for example by adjusting levels in ballast tanks and/or by actuating planes. Generally, the depths and/or strengths (i.e. temperature gradients and/or changes) of thermoclines change seasonally and yearly. While thermoclines may be semi-permanent in the tropics, thermoclines are usually variable in temperate regions and shallow to nonexistent in polar regions, where the water column is cold from the surface to the bottom. That is, thermoclines are not constant and hence controlling the watercraft may not be pre-determined.

In one example, detecting boundaries related to the environmental parameters comprises detecting a boundary between salt water and fresh water, for example based on a sensed salinity and/or density of the water. Generally, boundaries between salt water and fresh water occur at estuaries, where rivers (i.e. fresh water) enter seas or oceans (i.e. salt water). Fresh water has a lower density than sea water and a distinct fresh water layer may form at the surface. This change in density of the water thereby affects buoyancy of the watercraft and hence necessitating control actions so as to navigate predictably and/or safely therethrough, reactive and/or proactive to the change in density of the water. Brackish water forms by mixing of the fresh water and salt water, having an intermediate density and similarly affecting buoyancy of the watercraft. More generally, fresh water pockets, aquifers and lenses may be present in seas and oceans. Generally, the locations and/or strengths of boundaries between salt water and fresh water change seasonally and yearly, for example according to rainfall. That is, boundaries between salt water and fresh water are not constant and hence controlling the watercraft may not be pre-determined.

In one example, detecting boundaries related to the environmental parameters comprises detecting a boundary between currents in the water, for example based on a sensed relative velocity (i.e. speed and direction) of the water with respect to the watercraft. Generally, surface currents are driven by global winds while differences in a density of the water, resulting from variability of a temperature of the water and a salinity of the water cause deep ocean currents, known as thermohaline circulation. The change in relative velocity and/or density of the water thereby affects a trajectory and/or a buoyancy of the watercraft and hence necessitating control actions so as to navigate predictably and/or safely therethrough, reactive and/or proactive to the change in relative velocity and/or density of the water. Generally, the locations and/or strengths of boundaries between currents change seasonally and yearly. That is, boundaries between currents are not constant and hence controlling the watercraft may not be pre-determined.

In one example, obtaining the corresponding actions of the first watercraft comprises identifying actions performed by a human operator aboard the first watercraft. That is, the ML algorithm may be trained by determining relationships between the respective sets of environmental parameters and the corresponding actions of the watercraft of the set thereof, in which the actions are performed by the human operator and identified by the ML algorithm. That is, the ML algorithm monitors and learns from the human operator, by associating the environmental parameters with the identified actions performed by the human operator (i.e. watch and learn).

In one example, obtaining the corresponding actions of the first watercraft comprises identifying remedial (i.e. corrective) actions performed by a human operator aboard the first watercraft responsive to actions implemented by the ML algorithm. That is, the human operator performs one or more remedial actions, so as correct erroneous actions, for example, implemented by the ML algorithm. In this way, the ML algorithm learns from errors implemented thereby, with control overseen by the human operator.

In one example, the actions are selected from controlling a buoyancy, a rudder, a plane such as a bow plane, a sail plane or a stern plane, a thruster, a propeller, a propulsor (such as a pump jet) and/or a prime mover (such as an electric motor) of the watercraft. It should be understood that one or more actions may be performed and/or implemented. Generally, remedial actions may be as described with respect to the actions.

In one example, the training data include respective trajectory parameters of the set of watercraft, related to a velocity, a depth, a bearing, a pitch, a roll and/or a yaw of the respective watercraft. Suitable detectors for detecting these trajectory parameters are known. That is, respective trajectory parameters of the set of watercraft are obtained, thereby characterising current trajectories thereof and changes thereto, for example caused by the corresponding actions are obtained. For example, if a bearing of a watercraft is controlled by adjusting a rudder thereof to navigate towards a target, such as a waypoint, a change in trajectory responsive to the adjustment may be monitored. In one example, training the ML algorithm comprises determining relationships between the respective sets of environmental parameters, the respective sets of trajectory parameters, the corresponding actions and optionally, respective responses thereto, of the watercraft of the set thereof. That is, the ML algorithm may sense environmental parameters, detect trajectories, monitor control actions and optionally measure responses thereto (i.e. a control triangle), thereby providing iterative feedback control.

In one example, the training data include respective sets of shipping parameters, for example charts of shipping lanes. In one example, training the ML algorithm comprising determining relationships between the respective sets of shipping parameters and the corresponding actions of the watercraft of the set thereof. In this way, shipping lanes may be avoided, for example.

In one example, the training data includes respective sets of passive SONAR signals. In this way, sources of sound may be detected, for avoidance and/or for targeting. In one example, training the ML algorithm comprises determining relationships between respective sets of passive SONAR signals and the corresponding actions of the watercraft of the set thereof.

In one example, the training data include respective policies and corresponding trajectories of the set of watercraft, wherein each policy relates to navigating a watercraft of the set thereof in the water towards a target and wherein each corresponding trajectory comprises a series of states in a state space of the watercraft; and training the ML algorithm comprising determining relationships between the respective policies and corresponding trajectories of the watercraft of the set thereof based on respective results of comparing the trajectories and the targets.

Generally, a policy relates to navigating a watercraft towards a target and is a strategy used by the ML algorithm for navigating the watercraft towards the target. That is, the policy defines actions to be taken by the ML algorithm to navigate the watercraft towards the target according to inter alia the current trajectory and state of the watercraft.

In one example, a policy $\pi$ is defined in terms of a Markov Decision Process to which the policy $\pi$ refers i.e. to navigating the watercraft towards the target. In one example, the ML algorithm comprises and/or is RL agent and the policy ($\pi(s|\alpha)$) is a decision-making function used by the agent which calculates an action that provides maximum reward, as described below. In one example, the respective policies of the set of watercraft are provided by a single policy, for example a single policy that is updated during the training, for example during the training of a RL agent, as described below.

It should be understood that the watercraft is navigated towards the target. In otherwise, the desired goal is to reach the target with the watercraft, though the goal may not always be achieved, given an accuracy and/or precision of navigating the watercraft. In one example, respective targets of the watercraft are the same target. In this way, the ML algorithm is trained, for example optimised, to navigate the watercraft towards a particular target. In one example, respective targets of the watercraft are different. In this way, the ML algorithm is trained to navigate the watercraft towards different targets. In one example, respective targets of the watercraft are static (i.e. stationary with respect to the environment). In one example, respective targets of the watercraft are moving (i.e. non-stationary with respect to the environment).

It should be understood that a trajectory (also known as path) of a watercraft is the path of the watercraft through the water. Generally, a trajectory is influenced by inter alia the environmental parameters.

Each trajectory comprises the series of states (i.e. successive states) in the state space of the watercraft. Generally, environments comprise two types of spaces: state spaces and action spaces. In a fully observable environment, the total state at each time step in the environment may be sensed, for example by a RL agent. In a partially observable environment, a fraction of the environment may be sensed, for example by a RL agent. The total of all the states in an environment is called the episode, which concludes with the last state, the terminal state. It should be understood that the series of states includes at least two different states. It should be understood that the watercraft has a single state at any given time (i.e. a current state at a current time) and that the watercraft transitions from a current state to a new state, for example directly without a transitionary state or indirectly with a transitionary state.

In one example, navigating the watercraft of the set thereof towards the target comprises actioning state transitions of the watercraft, for example by a controller configured to control the watercraft for example provided by the ML algorithm such as an RL agent. By transitioning between the states, for example repeatedly, the watercraft is navigated (i.e. a net displacement) towards the target.

In one example, the series of states includes finite (i.e. discrete, digital) states of the watercraft. In this way, the watercraft is navigated by transitioning discretely between the finite states, for example directly from a first state to a fourth state, such that the watercraft moves between states. In this way, transitions between relatively different states is accelerated, providing relatively more responsive control. That is, the state space of the watercraft includes N of states, wherein N is a natural number greater than or equal to 2, for example 2, 3, 4, 5, 6, 7, 8, 9, 10 or more, and the series of states includes 2 or more of these N states. It should be understood that the N states are different states, for example corresponding with different configurations of the actions.

In one example, the series of states includes a continuum (i.e. infinite, analogue) states of the watercraft. In this way, the watercraft is navigated by transitioning continuously between the infinite states, for example indirectly from a first state to a fourth state via a second state and a third state, such that the watercraft iterates between states. In this way, transitions between relatively different states is graduated, enabling feedback control thereof.

In one example, each state of the series of states in the state space of the watercraft is associated with (i.e. due to, caused by) an action in an action space (also known as a control space), for example of a controller configured to control the watercraft for example provided by the ML algorithm such as an RL agent. It should be understood that an action causes a state transition of the watercraft.

In one example, the ML algorithm comprises and/or is a reinforcement learning, RL, agent; and training the ML algorithm comprises training the agent, comprising:

(a) actioning, by the agent, a watercraft of the set thereof according to a respective policy, wherein the policy is of an action space of the agent, comprising navigating the watercraft of the set thereof towards a target, thereby defining a corresponding trajectory comprising a series of states in a state space of the watercraft and thereby obtaining respective training data;

(b) determining a relationship between the policy and the trajectory based on a result of comparing the trajectory and the target and updating the policy based on the result; and (c) repeating steps (a) and (b) for the set of watercraft, using the updated policy.

In one example, the ML algorithm comprises and/or is a reinforcement learning, RL, algorithm, for example a model-based RL algorithm or a model-free RL algorithm. Other algorithms are known. Model-free RL algorithms are preferred, for example: a Q-learning algorithm such a DQN, C51, QR-DQN, HER, DDPG, TD3 or SAC algorithm; or a policy optimisation algorithm such as a policy gradient, A2C/A3C, PPO, TRPO, DDPG, TD3 or SAC algorithm. In one example, the ML algorithm comprises and/or is an ensemble method, using more than one algorithm, for example more than one model-free RL algorithm. In one example, the agent comprises and/or is a Deep Deterministic Policy Gradient, DDPG, agent and/or a Deep Q-Neural Network, DQN, agent.

A second aspect provides a method of controlling a communicatively isolated watercraft, wherein the watercraft is a submarine or a submersible submerged in water, the method implemented, at least in part, by a computer, comprising a processor and a memory, aboard the watercraft, the method comprising:

controlling, by a trained machine learning. ML, algorithm, the watercraft, comprising navigating the watercraft towards a target.

In this way, the watercraft is controlled to navigate towards the target, for example a waypoint, by the trained ML algorithm, for example autonomously without communication to an external controller (i.e. not by remote control, without data transmitted thereto).

The watercraft, the computer, the trained ML algorithm, the navigating and/or the target may be as described with respect to the first aspect mutatis mutandis. In one example, the trained ML algorithm is trained according to the method of the first aspect.

In one example, the method comprises obtaining, for example by the computer and/or by the trained ML algorithm such as by measuring and/or accessing, a set of environmental parameters, for example as described with respect to the first aspect. In one example, the method comprises controlling, by the trained ML algorithm, the watercraft responsive to the set of environmental parameters. In this way, the trained ML algorithm may control the watercraft reactively, for example according to changes in the environmental parameters and/or proactively, for example according to predicted or anticipated changes in the environmental parameters.

In one example, navigating the watercraft towards the target comprises implementing, by the trained ML algorithm, a first action, wherein the first action is selected from controlling a buoyancy, a rudder, a plane such as a bow plane, a sail plane or a stern plane, a thruster, a propeller, a propulsor and/or a prime mover of the watercraft. In one example, implementing, by the trained ML algorithm, the first action comprises repeatedly and/or iteratively implementing, by the trained ML algorithm, the first action. In one example, implementing, by the trained ML algorithm, the first action comprises, by the trained ML algorithm, the first action according to a policy, for example as described with respect to the first aspect. In one example, navigating the watercraft towards the target comprises implementing, by the trained ML algorithm, a second action, as described with respect to the first action.

In one example, navigating the watercraft towards the target is according to a policy, for example as described with respect to the first aspect. In this way, the trained ML algorithm controls the watercraft to navigate towards the target according to inter alia a current trajectory, environmental parameters and a state of the watercraft. In one example, navigating the watercraft towards the target comprises updating the policy, for example as described with respect to the first aspect. In this way, the training of the trained ML algorithm is improved.

In one example, the watercraft is an autonomous and/or unmanned watercraft. In this way, the watercraft is controlled without assistance, for example without actions and/or remedial actions performed by a human operator.

In one example, navigating the watercraft towards the target comprises navigating the watercraft via one or more boundaries related to environmental parameters, for example as described with respect to the first aspect. In this way, the watercraft may navigate through lakes, seas and/or oceans, for example, unassisted.

A third aspect provides a communicatively isolated watercraft, wherein the watercraft is a submarine or a submersible, including a computer, comprising a processor and a memory, thereaboard, wherein the computer comprises a trained machine learning, ML, algorithm for controlling the watercraft comprising navigating the watercraft towards a target.

A fourth aspect provides a computer comprising a processor and a memory configured to implement a method according to the first aspect and/or the second aspect. A fifth aspect provides a computer program comprising instructions which, when executed by a computer comprising a processor and a memory, cause the computer to perform a method according to the first aspect and/or the second aspect. A sixth aspect provides a non-transient computer-readable storage medium comprising instructions which, when executed by a computer comprising a processor and a memory, cause the computer to perform a method according to any of claims to the first aspect and/or the second aspect. A seventh aspect provides a machine learning, ML, algorithm trained according to the method according to the first aspect.

BRIEF DESCRIPTION OF THE FIGURES

Embodiments of the invention will now be described by way of example only with reference to the figures, in which:

FIG. 1 shows a method according to an exemplary embodiment;

FIG. 2 shows a method according to an exemplary embodiment;

DETAILED DESCRIPTION

FIG. 1 shows a method 100 according to an exemplary embodiment. The method 100 is of training a machine learning, ML, algorithm to control a watercraft. The watercraft is a submarine or a submersible submerged in water. The method is implemented, at least in part, by a computer, comprising a processor and a memory, aboard the watercraft.

At 102, the method comprises obtaining training data including respective sets of environmental parameters and corresponding actions of a set of communicatively isolated watercraft, including a first watercraft.

At 104, the method comprises training the ML algorithm comprising determining relationships between the respective sets of environmental parameters and the corresponding actions of the watercraft of the set thereof.

The method 100 may include any of the steps described with respect to the first aspect.

FIG. 2 shows a method 200 according to an exemplary embodiment. The method 200 is of controlling a communicatively isolated watercraft. The watercraft is a submarine or a submersible submerged in water. The method is implemented, at least in part, by a computer, comprising a processor and a memory, aboard the watercraft.

At 202, the method comprises controlling, by a trained machine learning, ML, algorithm, the watercraft, comprising navigating the watercraft towards a target.

The method 200 may include any of the steps described with respect to the second aspect.

Figure 3:
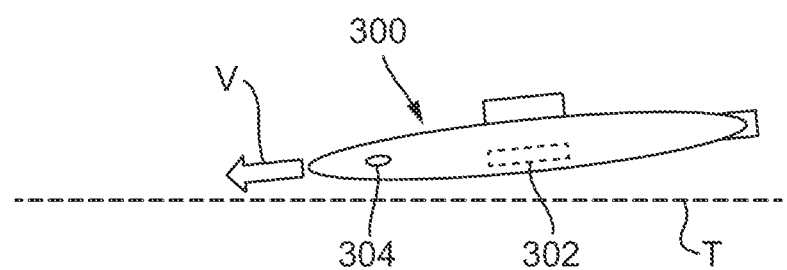
FIG. 3 shows a method according to an exemplary embodiment.

FIG. 3 shows a method according to an exemplary embodiment. Particularly, FIG. 3 shows a side elevation view of a submarine 300 diving with a velocity V in water W (salt water), having a surface S and a thermocline T. The thermocline T (i.e. a boundary) is detected, based on temperature sensor signals (i.e. environmental parameters). A density of the water W below the thermocline T is relatively higher, since a temperature of the water W therebelow is relatively lower, compared with the water W in the epipelagic zone. To maintain the velocity V of the submarine 300 upon diving through the thermocline T (i.e. including maintaining a constant rate of descent), corresponding actions are actioned: a level in the ballast tank 302 of the submarine 300 is adjusted and optionally, an inclination of the bow plane 304 adjusted. The environmental parameters and the corresponding actions may be used for training the ML algorithm. Alternatively, the trained ML algorithm may implement these actions responsive to detecting the thermocline T.

Figure 4:
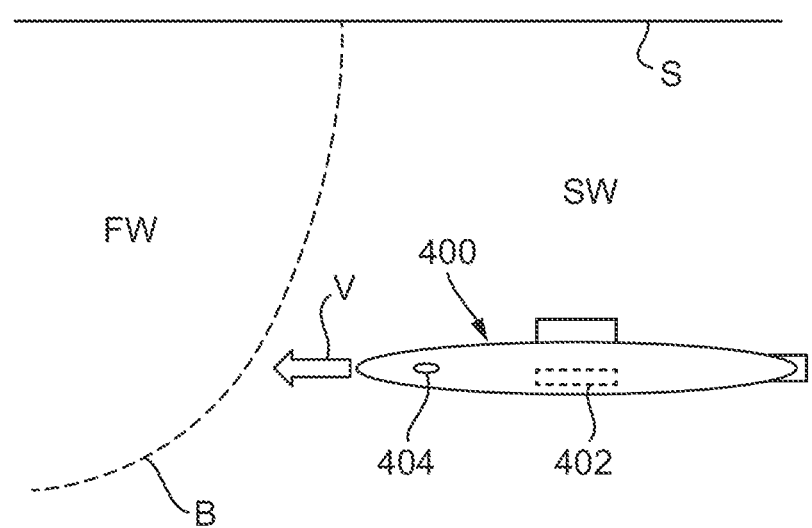
FIG. 4 shows a method according to an exemplary embodiment.

FIG. 4 shows a method according to an exemplary embodiment. Particularly, FIG. 4 shows a side elevation view of a submarine 400 moving with a velocity V in salt water SW towards a fresh water FW pocket for example near an estuary, having a surface S. A boundary B between the salt water SW and the fresh water FW is detected, based on salinity sensor signals (i.e. environmental parameters). A density of the fresh water FW is relatively lower, compared with the salt water FW. To maintain the velocity V of the submarine 400 upon moving through the boundary B (i.e. including maintaining a constant depth), corresponding actions are actioned: a level in the ballast tank 402 of the submarine 400 is adjusted and optionally, an inclination of the bow plane 404 adjusted. The environmental parameters and the corresponding actions may be used for training the ML algorithm. Alternatively, the trained ML algorithm may implement these actions responsive to detecting the boundary B.

Figure 5:
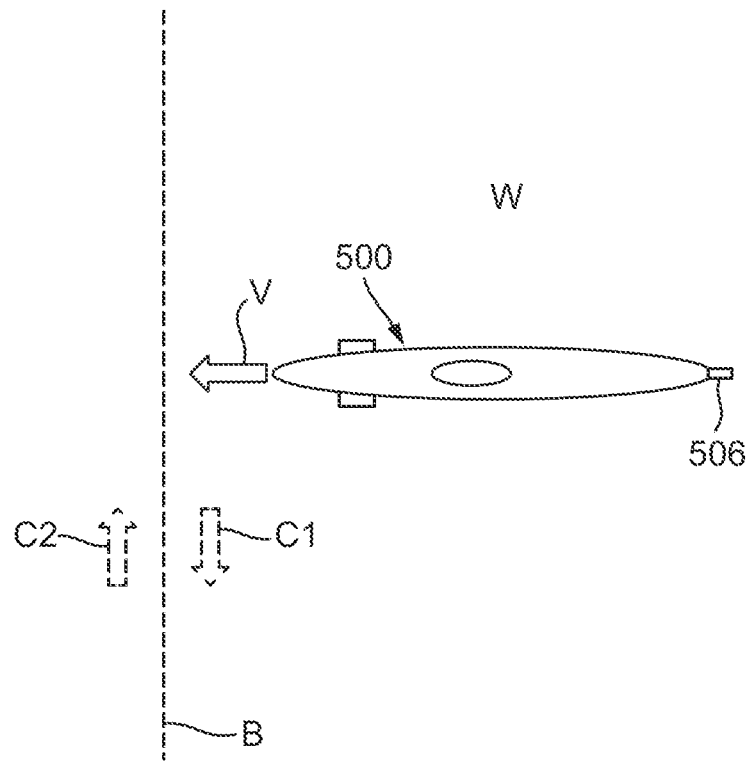
FIG. 5 shows a method according to an exemplary embodiment.

FIG. 5 shows a method according to an exemplary embodiment. Particularly, FIG. 5 shows a plan view of a submarine 500 moving with a velocity V in water W (salt water). A boundary B between currents C1 and C2 is detected, based on relative velocity sensor signals (i.e. environmental parameters). A velocity of the water W due to the current C1 is different to the velocity of the water W due to the current C2. To maintain the velocity V of the submarine 500 upon moving through the boundary B (i.e. including maintaining a constant bearing), corresponding actions are actioned: an inclination of the rudder plane 506 adjusted. The environmental parameters and the corresponding actions may be used for training the ML algorithm. Alternatively, the trained ML algorithm may implement these actions responsive to detecting the boundary B.

The invention claimed is:

1. A method of training a machine learning, ML, algorithm to control a watercraft, wherein the watercraft is a submarine or a submersible submerged in water, the method implemented, at least in part, by a computer, comprising a processor and a memory, aboard the watercraft, the method comprising:

obtaining training data including respective sets of environmental parameters and corresponding actions of a set of communicatively isolated watercraft, including a first watercraft; and training the ML algorithm comprising determining relationships between the respective sets of environmental parameters and the corresponding actions of the watercraft of the set thereof;

wherein determining the relationships between the respective sets of environmental parameters and the corresponding actions of the watercraft of the set thereof comprises detecting boundaries related to the environmental parameters and relating the corresponding actions to the detected boundaries;

wherein detecting boundaries related to the environmental parameters includes detecting a thermocline based on a sensed temperature and/or density of the water, and the corresponding actions account for changes in density of the water to maintain a constant depth, buoyancy and/or a trajectory of the watercraft through the thermocline; and wherein the watercraft is a communicatively isolated watercraft.

2. The method according to claim 1, wherein detecting boundaries related to the environmental parameters further includes one or both of:

detecting a boundary between salt water and fresh water based on a sensed salinity and/or density of the water, and the corresponding actions account for changes in density of the water to maintain a constant depth, buoyancy and/or a trajectory of the watercraft through the boundary between salt water and fresh water; and/or detecting a boundary between currents in the water based on a sensed relative velocity of the water with respect to the watercraft, and the corresponding actions account for changes in density of the water to maintain a constant depth, buoyancy and/or a trajectory of the watercraft through the boundary between currents.

3. The method according to claim 1, wherein obtaining the corresponding actions of the first watercraft comprises identifying actions performed by a human operator aboard the first watercraft.

4. The method according to claim 1, wherein obtaining the corresponding actions of the first watercraft comprises identifying remedial actions performed by a human operator aboard the first watercraft responsive to actions implemented by the ML algorithm.

5. The method according to claim 1, wherein the actions are selected from controlling: a buoyancy, a rudder, a control surface or plane, a thruster, a propeller, a propulsor, and/or a prime mover, of the watercraft.

6. The method according to claim 1, wherein the sets of environmental parameters include one or more sensor signals, the one or more sensor signals related to a pressure, a temperature, a salinity, a density, a tide, a current, a relative velocity, and/or a seabed of the water.

7. The method according to claim 1:
wherein the training data include respective policies and corresponding trajectories of the set of watercraft, wherein each policy relates to navigating a watercraft of the set thereof in the water towards a target and wherein each corresponding trajectory comprises a series of states in a state space of the watercraft; and
wherein training the ML algorithm comprising determining relationships between the respective policies and corresponding trajectories of the watercraft of the set thereof based on respective results of comparing the trajectories and the targets.

8. The method according to claim 7, wherein the ML algorithm comprises and/or is a reinforcement learning, RL, agent, and wherein training the ML algorithm comprises training the agent, the training comprising:
(a) actioning, by the agent, a watercraft of the set thereof according to a respective policy, wherein the policy is of an action space of the agent, comprising navigating the watercraft of the set thereof towards a target, thereby defining a corresponding trajectory comprising a series of states in a state space of the watercraft and thereby obtaining respective training data;
(b) determining a relationship between the policy and the trajectory based on a result of comparing the trajectory and the target and updating the policy based on the result; and
(c) repeating (a) and (b) for the set of watercraft, using the updated policy.

9. The method according to claim 5, wherein the control surface or plane includes a bow plane, a sail plane, or a stern plane.

10. A method of controlling a communicatively isolated watercraft, wherein the watercraft is a submarine or a submersible submerged in water, the method implemented, at least in part, by a computer, comprising a processor and a memory, aboard the watercraft, the method comprising:
controlling, by a trained machine learning, ML, algorithm, the watercraft, the controlling comprising navigating the watercraft towards a target;
wherein navigating the watercraft towards the target comprises navigating the watercraft via one or more boundaries related to environmental parameters;
wherein the trained ML algorithm is trained to the detect the one or more boundaries related to the environmental parameters;
wherein detecting the one or more boundaries related to the environmental parameters includes detecting a thermocline based on a sensed temperature and/or density of the water; and
wherein controlling, by the trained ML algorithm, the watercraft includes accounting for changes in density of the water to maintain a constant depth, buoyancy and/or a trajectory of the watercraft through the thermocline, while navigating the watercraft towards the target.

11. The method according to claim 10, wherein navigating the watercraft towards the target is according to a policy.

12. The method according to claim 10, wherein the set of environmental parameters are obtained by use of data recording devices aboard a set of communicatively isolated watercraft.

13. The method according to claim 10, wherein the watercraft is an autonomous and/or unmanned watercraft.

14. The method according to claim 10, wherein:
detecting the one or more boundaries related to the environmental parameters further includes one or both of (a) detecting a boundary between salt water and fresh water based on a sensed salinity and/or density of the water, and/or (b) detecting a boundary between currents in the water based on a sensed relative velocity of the water with respect to the watercraft; and
controlling, by the trained ML algorithm, the watercraft includes accounting for changes in density of the water to maintain a constant depth, buoyancy and/or a trajectory of the watercraft through the boundary between salt water and fresh water and/or the boundary between currents in the water, while navigating the watercraft towards the target.

15. A non-transient processor-readable medium encoded with instructions that when executed by one or more processors cause a process to be carried out for controlling a communicatively isolated watercraft, wherein the watercraft is a submarine or a submersible submerged in water, the process comprising:
controlling, by a trained machine learning, ML, algorithm, the watercraft, the controlling comprising navigating the watercraft towards a target;
wherein navigating the watercraft towards the target comprises navigating the watercraft via one or more boundaries related to environmental parameters;
wherein the trained ML algorithm is trained to the detect the one or more boundaries related to the environmental parameters;
wherein detecting the one or more boundaries related to the environmental parameters includes detecting a thermocline based on a sensed temperature and/or density of the water; and
wherein controlling, by the trained ML algorithm, the watercraft includes accounting for changes in density of the water to maintain a constant depth, buoyancy and/or a trajectory of the watercraft through the thermocline.

16. The non-transient processor-readable medium according to claim 15, wherein navigating the watercraft towards the target is according to a policy.

17. The non-transient processor-readable medium according to claim 15, wherein the set of environmental parameters are obtained by use of data recording devices aboard a set of communicatively isolated watercraft.

18. The non-transient processor-readable medium according to claim 15, wherein the watercraft is an autonomous and/or unmanned watercraft.

19. The non-transient processor-readable medium according to claim 15, wherein:
detecting the one or more boundaries related to the environmental parameters further includes one or both of (a) detecting a boundary between salt water and fresh water based on a sensed salinity and/or density of the water, and/or (b) detecting a boundary between currents in the water based on a sensed relative velocity of the water with respect to the watercraft; and
controlling, by the trained ML algorithm, the watercraft includes accounting for changes in density of the water to maintain a constant depth, buoyancy and/or a trajectory of the watercraft through the boundary between salt water and fresh water and/or the boundary between currents in the water, while navigating the watercraft towards the target.

20. A communicatively isolated watercraft comprising the non-transient processor-readable medium according to claim 15.

\* \* \* \* \*